United States Patent
Xiao

(10) Patent No.: US 10,698,169 B1
(45) Date of Patent: Jun. 30, 2020

(54) MODULE WITH WAVELENGTH-BASED DIRECTIONAL BIAS OF LIGHT FOR RECEIVING AND TRANSMITTING OPTICAL SIGNALS

(71) Applicants: SHUNSIN TECHNOLOGY (ZHONG SHAN) LIMITED, Zhongshan (CN); ShunSin Technology Holdings Limited Taiwan Branch, New Taipei (TW)

(72) Inventor: Han-Zhang Xiao, Zhongshan (CN)

(73) Assignees: SHUNSIN TECHNOLOGY (ZHONG SHAN) LIMITED, Zhongshan (CN); ShunSin Technology Holdings Limited Taiwan Branch, New Taipei (TW)

( * ) Notice: Subject to any disclaimer, the term of this patent is extended or adjusted under 35 U.S.C. 154(b) by 0 days.

(21) Appl. No.: 16/725,713

(22) Filed: Dec. 23, 2019

(30) Foreign Application Priority Data

Apr. 30, 2019 (CN) .......................... 2019 1 0363064

(51) Int. Cl.
*G02B 6/42* (2006.01)
*H04B 10/25* (2013.01)
*H04B 10/40* (2013.01)

(52) U.S. Cl.
CPC ......... *G02B 6/4246* (2013.01); *G02B 6/4206* (2013.01); *H04B 10/2503* (2013.01); *H04B 10/2504* (2013.01); *H04B 10/40* (2013.01)

(58) Field of Classification Search
CPC .. G02B 6/4206; G02B 6/4212; G02B 6/4214; G02B 6/4246; H04B 10/40; H04B 10/43; H04B 10/2503; H04B 10/2504
USPC ......................................... 385/14, 31, 88–92
See application file for complete search history.

(56) References Cited

U.S. PATENT DOCUMENTS

| 2004/0146304 | A1* | 7/2004 | Kuhara | G02B 6/4206 398/138 |
| 2008/0187321 | A1* | 8/2008 | Kawamura | H04B 10/40 398/139 |
| 2010/0253660 | A1* | 10/2010 | Hashimoto | G01J 1/42 345/207 |

FOREIGN PATENT DOCUMENTS

| CN | 203631978 U | 6/2014 |
| CN | 204462461 U | 7/2015 |

* cited by examiner

*Primary Examiner* — Michael P Mooney
(74) *Attorney, Agent, or Firm* — ScienBiziP, P.C.

(57) ABSTRACT

An optical module with directional bias of light beams for improved reception and transmission of optical signals includes a substrate, a photodetector disposed on the substrate, and an optical path control element disposed above the substrate. The optical path control element includes a filter and a reflector. The filter has an upper surface and a lower surface opposite to the upper surface, and the reflector is in contact with the upper surface. A first light beam enters the filter through the lower surface, and is reflected by the reflector to the photodetector. A light source is disposed on the substrate and emits a second light beam. The second light beam is reflected by the lower surface and away from the cavity.

10 Claims, 5 Drawing Sheets

MODULE WITH WAVELENGTH-BASED DIRECTIONAL BIAS OF LIGHT FOR RECEIVING AND TRANSMITTING OPTICAL SIGNALS

FIELD

The subject matter herein generally relates to optical signals and handling.

BACKGROUND

In optical communication networks, optical modules transmit and/or receive optical signals in optical fibers. The optical receiving module is an optical module that receives optical signals, but does not transmit optical signals. The optical transmission module is an optical module that transmits optical signals, but does not receive optical signals. The optical transceiver module is an optical module that transmits and receives optical signals. As the demand for data throughput increases, the data rate or bandwidth of optical fiber networks is also increasing. A conventional technology is to transmit and receive optical signals of different wavelengths on each optical fiber, which is commonly referred to as bidirectional (BiDi) communication.

However, the design and manufacture of multi-channel optical modules with BiDi functions requires accurate optical alignment between the light source and the optical components.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
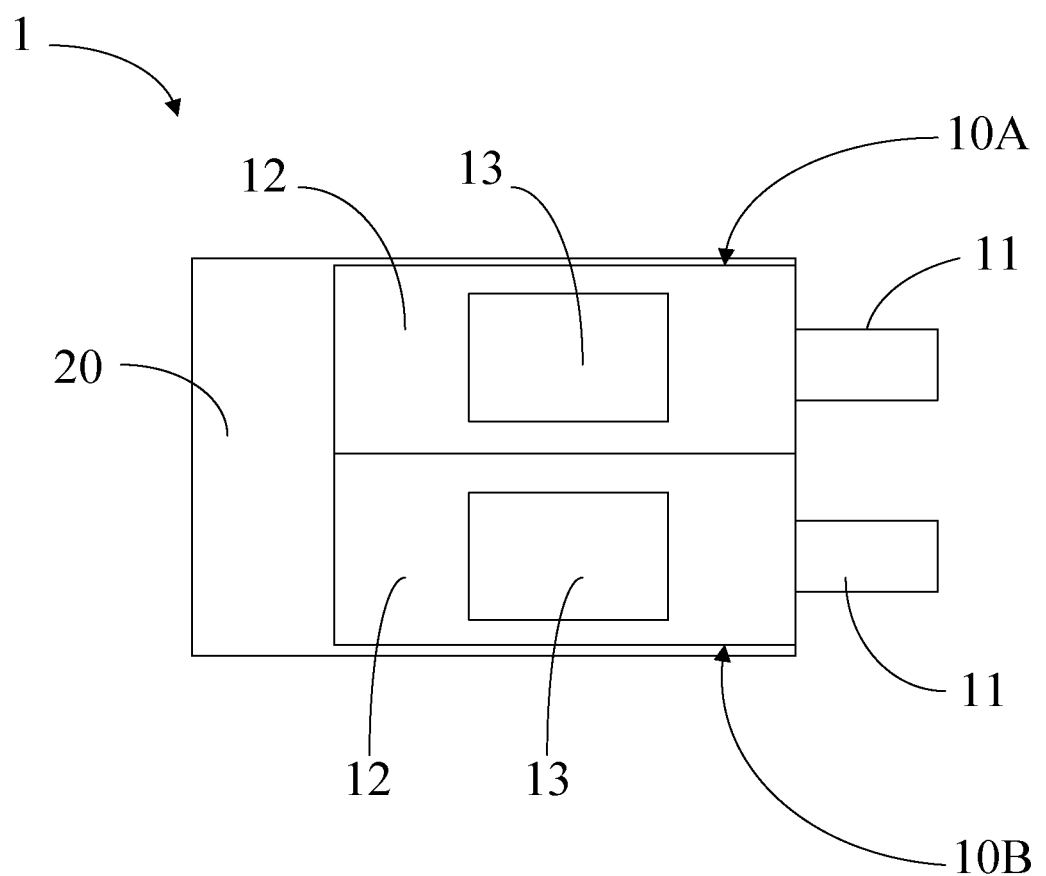
FIG. 1 is a top view of an optical module according to an embodiment of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one".

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 2:
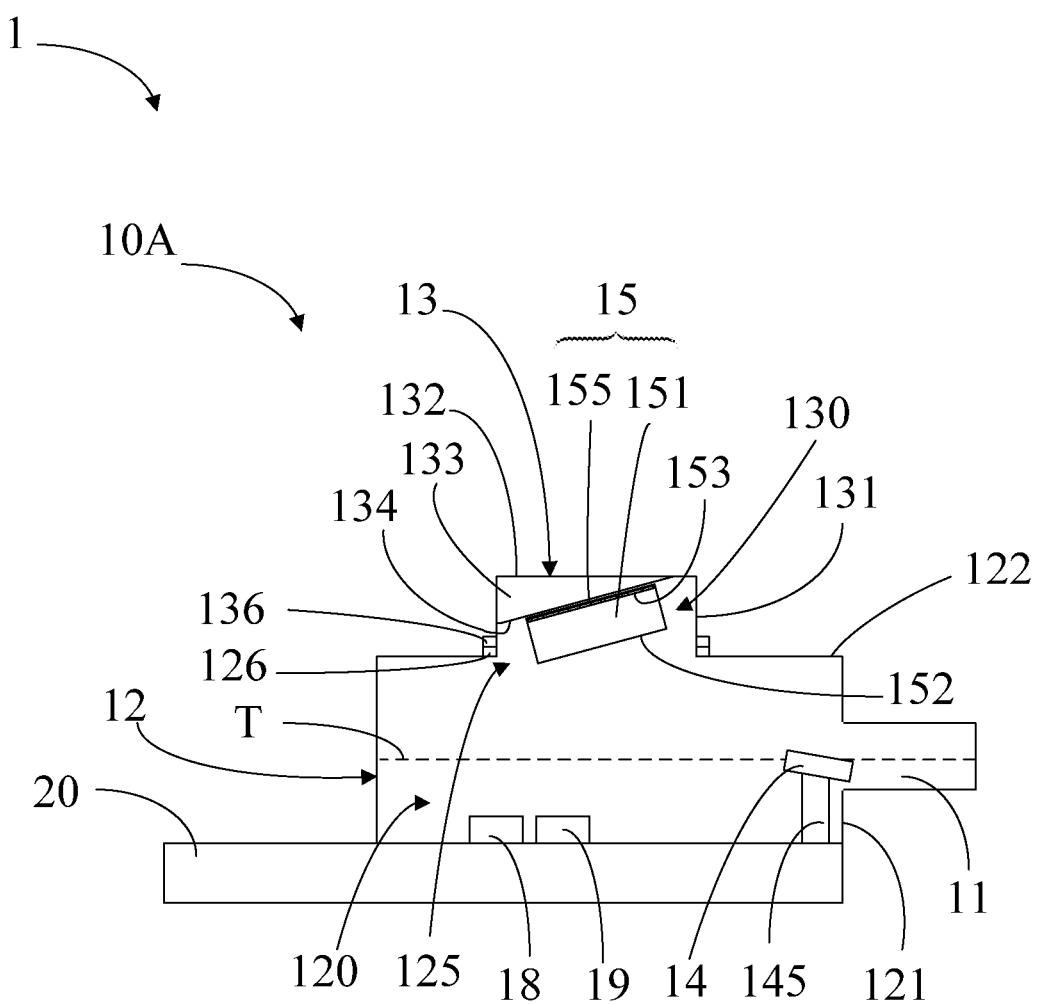
FIG. 2 is a cross-sectional view of the optical module.

FIG. 1 shows an optical module 1 according to an embodiment of the disclosure, FIG. 2 shows optical module 1 in cross-section. In an embodiment, the optical module 1 is adapted to mate with a cable. In one embodiment, the optical module 1 comprises two optical signal components, 10A and 10B, disposed on the substrate 20. The optical module 1 can emit and receive optical signals, into and from optical fibers.

The optical signal component 10A is referred to as "first component", and optical signal component 10B is referred to as "second component". In an embodiment of the disclosure, the structures of the first component 10A and the second component 10B are the same, so only the structural details of the first component 10A is described.

Figure 3:
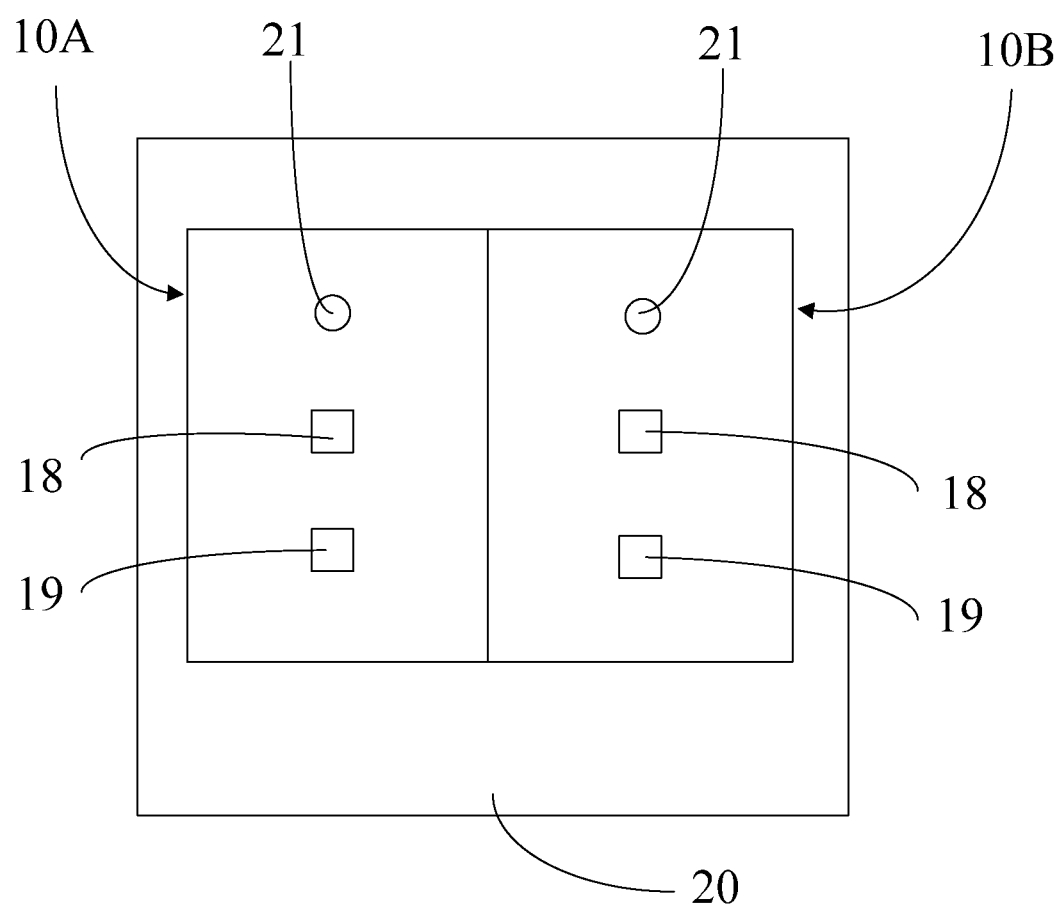
FIG. 3 is a top view of a light source and a photodetector of the optical module disposed on a substrate.

In an embodiment, the first component 10A comprises an optical port 11, a cavity 12, a top frame 13, a mirror 14 (refer to FIG. 3), an optical path control element 15 (FIG. 3), a photodetector 18 (FIG. 3), and a light source 19 (FIG. 3). The number of components of the first component 10A can be increased or decreased, and is not limited to this embodiment.

Referring to FIG. 2, in an embodiment, the cavity 12 comprises an annular sidewall structure 121 and a top wall structure 122. The sidewall structure 121, the top wall structure 122 and the substrate 20 define an internal space 120 to receive the components of the optical module 1. The optical port 11 is a tubular structure. The optical port 11 is connected to the sidewall structure 121 of the cavity 12 and is in communication with the internal space 120, the optical port 11 can connect to optical fibers. The horizontal axis T of the cavity 12 passes through the center of the optical port 11 and passes through opposite sides of the sidewall structure 121 of the cavity 12. The mirror 14 is disposed on the horizontal axis T, and its reflecting surface is disposed at an angle with respect to the horizontal axis T. The angle may be between 5 and 30 degrees.

The mirror 14 may be disposed on the support frame 145 in the internal space 120 and affixed to the support frame 145 by an adhesive such as epoxy. The support frame 145 may have an inclined surface to set the angle of the mirror 14. In another embodiment, the mirror 14 is omitted and the light from the optical port 11 is directly emitted toward the optical path control element 15.

In an embodiment, the cavity 12 further comprises a top opening 125 formed in the middle of the top wall structure 122. A locating element 126 is provided at the edge of the top wall structure 122 adjacent to the top opening 125. The locating element 126 is configured to secure the top frame 13. The locating element 126 can be a hook, a stop slot, or other suitable structure.

The top frame 13 comprises an annular sidewall structure 131 and a top wall structure 132. The sidewall structure 131, the top wall structure 132 and the cavity 12 define the placement space 130 to receive the optical path control element 15. The placement space 130 communicates with the internal space 120 through the top opening 125. A support element 133 having an inclined surface 134 is disposed in the placement space 130. The inclined surface 134 faces the side surface of the sidewall structure 121 that connects to the optical port 11. A locating element 136 is disposed on the outer surface of the sidewall structure 131 corresponding to the locating element 126. The locating element 136 has a structure corresponding to the locating element 126. For example, if the locating element 126 is an annular groove, the locating element 136 can be a flange that projects outwardly from the sidewall structure 131.

The optical path control element 15 determines direction of onward travel of light based on the wavelength of the incident light. In an embodiment, the optical path control element 15 comprises a filter 151 and a reflector 155. The lower surface 152 of the filter 151 is disposed to correspond to the mirror 14, and the upper surface 153 of the filter 151 is attached to the inclined surface 134. Thus, the optical path control element 15 is offset from the horizontal axis T.

If the mirror 14 is omitted, the optical path control element 15 may be disposed on the horizontal axis T. The reflector 155 may be a film formed on the upper surface 153 of the filter 151 with high reflectance. The film may comprise a metal film of aluminum, silver, gold, or the like. The reflector 155 is located between the upper surface 153 and the inclined surface 134. In other embodiments, the reflector 155 is formed on the inclined surface 134.

In an embodiment, the cavity 12 (including the locating elements 126) and the top frame 13 (including the locating elements 136) are plastic molded parts made by known plastic injection molding processes. Since the plastic parts can be made very precisely, the inclined surface 134 can be disposed very precisely at a specific angle with respect to the mirror 14 when the locating elements 126 and 136 are combined with each other.

The photodetector 18 is disposed on the substrate 20 and detects the optical signals carrying data transmitted from the optical fiber. The photodetector 18 converts the optical signals into electrical signals. The electrical signals are then amplified and processed by processing circuit to recover the data. The optical signals from the optical fiber are optically coupled to the photodetector 18 by the mirror 14 and the optical path control element 15. In an embodiment, the photodetector 18 comprises a P-doped-intrinsic-doped-N (PIN) diode.

The light source 19 is disposed on the substrate 20 adjacent to the photodetector 18 and is driven by a driver (not shown) to generate optical signals. The optical signals are modulated in amplitude, phase, or polarization according to the data. The modulated optical signal is optically coupled to the optical fiber through mirror 14 and optical path control element 15. In an embodiment, the light source 19 may comprise a vertical cavity surface emitting laser diode (VCSEL) or a light emitting diode (LED). The light source 19 emits light beams having a wavelength in the range of about 840 nm to about 950 nm.

Figure 4:
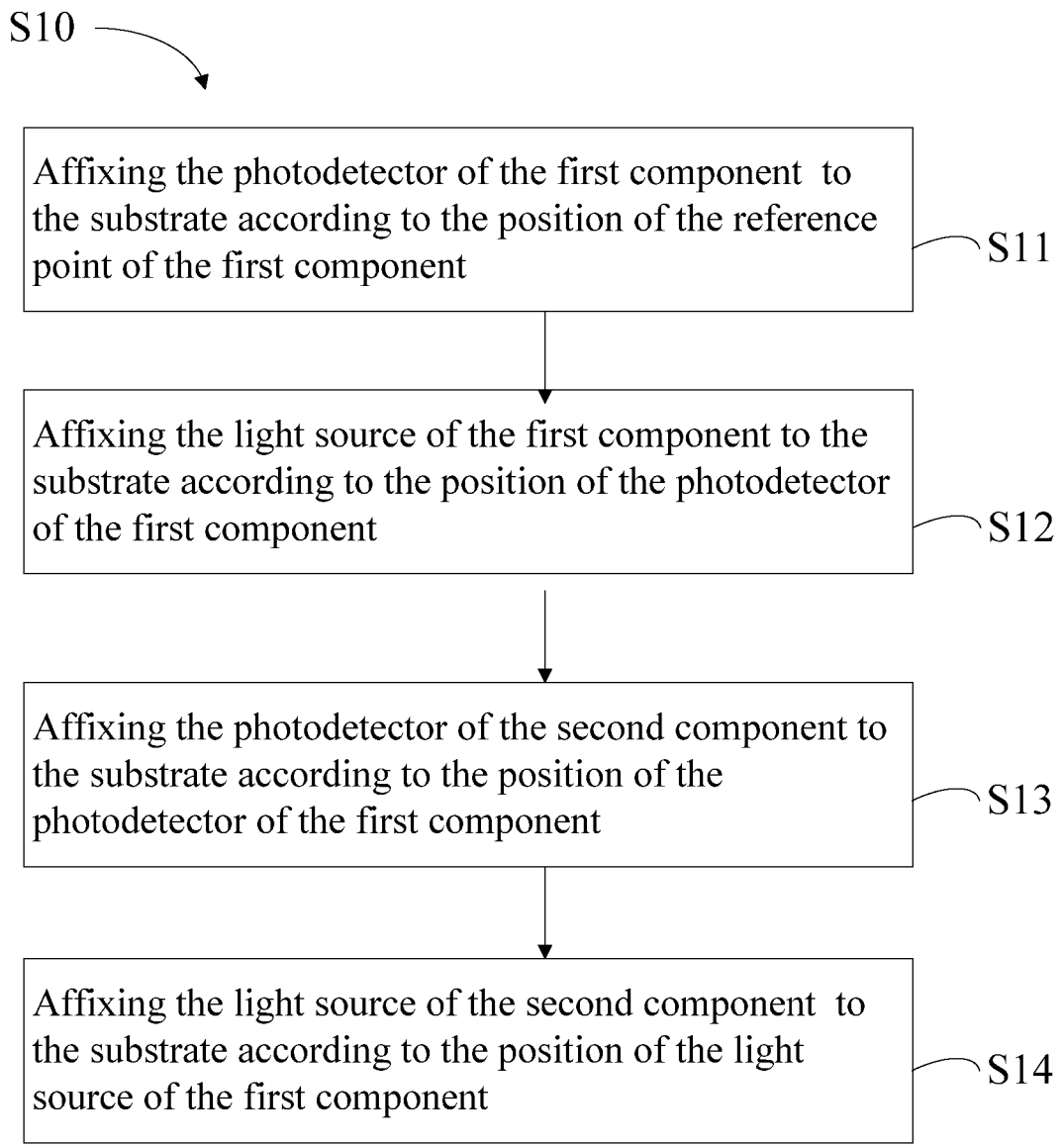
FIG. 4 is a flow chart of a method of mounting a light source and a photodetector of an optical module to a substrate.

FIG. 3 shows a light source and a photodetector of an optical module disposed on the substrate according to an embodiment of the disclosure. FIG. 4 shows a method (method S10) of mounting a light source and a photodetector of an optical module to the substrate according to an embodiment of the disclosure. The method S10 of mounting the photodetector 18 and the light source 19 to the substrate 20 comprises affixing the photodetector 18 of the first component 10A to the substrate 20 according to the position of the reference point 21 of the first component 10A (S11).

In an embodiment, the step S11 is performed by a detecting device. The reference point of the detecting device may overlap with the reference point 21 on the substrate 20, and the position of the irradiated spot on the substrate 20 is detected by machine vision. The relative position of the spot position to the reference point 21 is calculated, and the installation position of the photodetector 18 is determined according to the calculated position.

Figure 5:
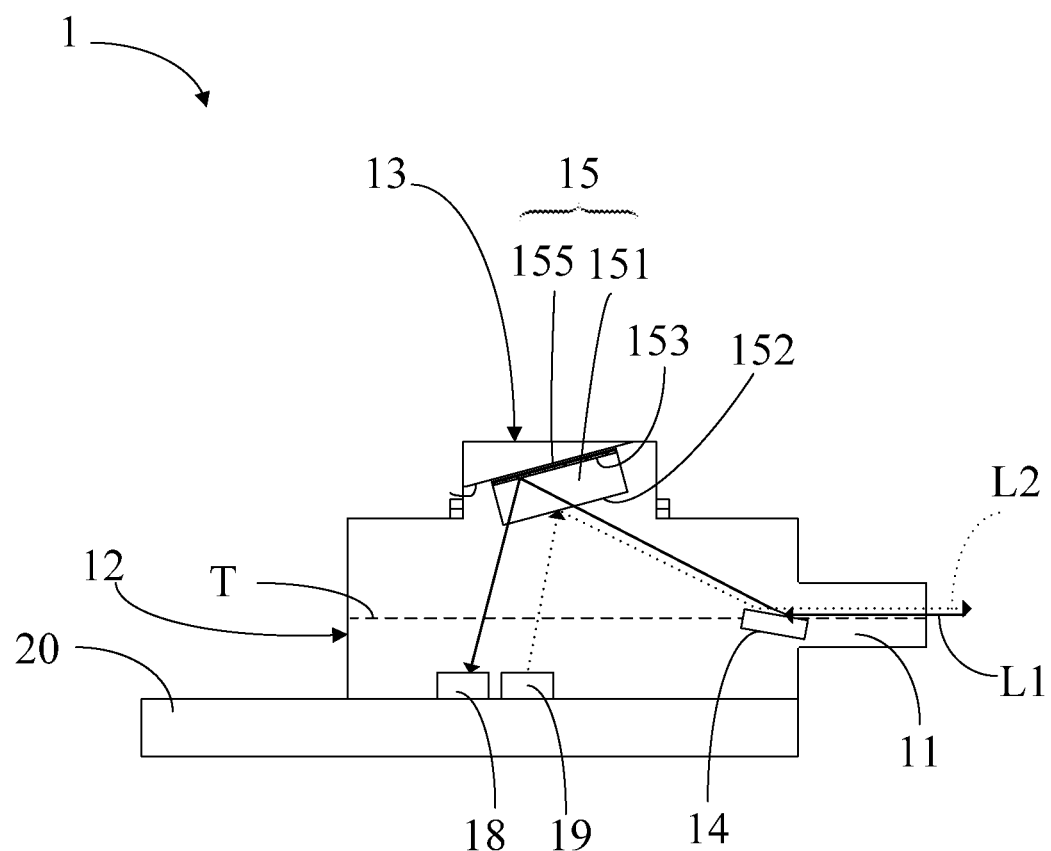
FIG. 5 is a schematic diagram of light travelling directions during operation of the optical module.

In an embodiment, as shown in FIG. 5, the spot is formed by external light beam L1 from the optical port 11. The light beam L1 is reflected to the optical path control element 15 by the mirror 14. Since the light beam L1 has a certain wavelength (for example, 908 nm) that can pass through the lower surface 152 of the filter 151, the light beam L1 can be incident into the filter 151 and reflected by the reflector 155 to be incident on the substrate 20.

After the light beam L1 passes through the optical path control element 15, deviation of the spot does not occur since the reflector 155 is directly formed on the upper surface 153 of the filter 151. Thus the detecting device can accurately determine the location of the photodetector 18, increasing the performance of signal transmission. In one embodiment, the position of the photodetector 18 is within an error range of between ±3 um.

The method S10 of mounting the photodetector 18 and the light source 19 to the substrate further comprises step S12 of affixing the light source 19 of the first component 10A to the substrate 20 according to the position of the photodetector 18 of the first component 10A. In one embodiment, the position of the light source 19 is determined directly from the position of the photodetector 18. For example, the light source 19 can be disposed on a side of the photodetector 18 away from the reference point 21 and spaced apart from the photodetector 18 by a predetermined distance. In an embodiment, as shown in FIG. 5, the light beam L2 generated by the precisely positioned light source 19 will be directed toward the light path control element 15. Since the light beam L2 can have a wavelength (for example, 855 nm) that cannot pass through the lower surface 152 of the filter 151, the light beam L1 cannot be incident into the filter 151, but is directly reflected to the mirror 14 through the lower surface 152, and is reflected to the optical port 11 by the mirror.

The method S10 further comprises affixing the photodetector 18 of the second component 10B to the substrate 20 according to the position of the photodetector 18 of the first component 10A (S13). In step S14, the position of the light source 19 of the second component 10B is affixed to the substrate 20 according to the position of the light source 19 of the first component 10A.

In an embodiment, since the respective cavities 12 of the first component 10A and the second component 10B are integrally formed by Optical Sub-Assembly (OSA) technology, the distance between the optical port 11 of the first component 10A and that of the second component 10B can be accurately controlled. In addition, the respective positions of the mirror 14 and the optical path control element 15 of the first component 10A and the second component 10B are the same, so that the positions of the photodetector 18 and the light source 19 of the second component 10B can be determined according to the first component 10A.

The optical module 1 of the disclosure achieves a two-way communication by directly forming a reflector on the surface of the filter. Since the light beam passes through the filter and is reflected by the reflector, no deviation of the spot occurs, so the photodetector and the light source can be accurately placed on the substrate. Therefore, the communication performance of the optical module is improved, and the process flow for manufacturing is simplified.

Many details are often found in the relevant art, thus many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An optical module, comprising:
    a substrate;
    an optical fiber port;
    a photodetector disposed on the substrate; and
    an optical path control element disposed above the substrate, comprising a filter and a reflector, wherein the filter has an upper surface and a lower surface opposite to the upper surface, the reflector is in contact with the upper surface, a first light beam through the optical fiber port enters the filter through the lower surface, and is reflected by the reflector to the photodetector.

2. The optical module as claimed in claim 1, further comprising a cavity, wherein the first light beam enters the cavity along a horizontal axis of the cavity, and is refracted to the optical path control element by a mirror disposed on the horizontal axis.

3. The optical module as claimed in claim 2, further comprising a top frame, wherein the top frame communicates with an internal space of the cavity through a top opening in the cavity, and the optical path control element is disposed in the top frame.

4. The optical module as claimed in claim 1, wherein the reflector comprises a reflective film coated on the upper surface.

5. The optical module as claimed in claim 2, further comprising a light source disposed on the substrate, wherein the light source emits a second light beam, and the second light beam is reflected by the lower surface and away from the cavity.

6. An optical module, comprising:
    a cavity having a horizontal axis;
    an optical port connecting the cavity and having a center passing through the horizontal axis, wherein the optical port is configured to allow light beams to enter or exit the cavity;
    a photodetector configured to sense the light beam enter the cavity;
    a mirror disposed on the horizontal axis in the cavity; and
    an optical path control element disposed in the cavity and offset from the horizontal axis, comprising a filter and a reflector, wherein the filter has an upper surface and a lower surface opposite to the upper surface, the reflector is in contact with the upper surface, a first light beam from outside of the cavity enters the filter through the lower surface, and is reflected by the reflector to the photodetector.

7. The optical module as claimed in claim 6, further comprising a top frame, wherein the top frame communicates with an internal space of the cavity through a top opening in the cavity, and the optical path control element is disposed in the top frame.

8. The optical module as claimed in claim 6, wherein the reflector comprises a reflective film coated on the upper surface.

9. The optical module as claimed in claim 6, further comprising a light source disposed in the cavity, wherein the light source emits a second light beam, and the second light beam is reflected by the lower surface and away from the cavity.

10. The optical module as claimed in claim 6, wherein the optical port is configured to connect an optical fiber.

* * * * *